US011886140B2

(12) United States Patent
Suzuki

(10) Patent No.: US 11,886,140 B2
(45) Date of Patent: Jan. 30, 2024

(54) INFORMATION PROCESSING APPARATUS AND IMAGE FORMING APPARATUS

(71) Applicant: Canon Kabushiki Kaisha, Tokyo (JP)

(72) Inventor: Shinya Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/062,093

(22) Filed: Dec. 6, 2022

(65) Prior Publication Data

US 2023/0185226 A1 Jun. 15, 2023

(30) Foreign Application Priority Data

Dec. 13, 2021 (JP) ................................ 2021-201769

(51) Int. Cl.
*G03G 15/00* (2006.01)

(52) U.S. Cl.
CPC ......... *G03G 15/553* (2013.01); *G03G 15/502* (2013.01)

(58) Field of Classification Search
CPC ........................... G03G 15/502; G03G 15/553
USPC ............................................................ 399/12
See application file for complete search history.

(56) References Cited

U.S. PATENT DOCUMENTS 8,994,969 B2 * 3/2015 Miyazaki ........... G03G 15/5079
358/1.15

FOREIGN PATENT DOCUMENTS

JP 2010004483 * 1/2010
JP 2017-017611 A 1/2017

* cited by examiner

*Primary Examiner* — Hoan H Tran
(74) *Attorney, Agent, or Firm* — Venable LLP

(57) ABSTRACT

An information processing apparatus can communicate with an image forming apparatus that forms an image on a sheet. The information processing apparatus includes: an acquisition unit configured to acquire error information about an error that has occurred in the image forming apparatus, and maintenance information about maintenance work performed on the image forming apparatus; a memory configured to store a plurality of pieces of error information acquired by the acquisition unit; and a controller. The controller is configured to: determine, from the plurality of pieces of error information stored in the memory, based on the maintenance information, first error information about an error that has occurred during the maintenance work; and determine an error part of the image forming apparatus based on second error information obtained by excluding the first error information from the plurality of pieces of error information stored in the memory.

20 Claims, 8 Drawing Sheets

| ERROR DETAILS CODE (401) | DETECTION CONTENTS (402) | ERROR CAUSE (403) |
|---|---|---|
| 0010001 | ROTATION DETECTION SENSOR CANNOT DETECT ROTATION OF INTERMEDIATE TRANSFER BELT DESPITE DRIVING OF INTERMEDIATE TRANSFER BELT DRIVE UNIT | INTERMEDIATE TRANSFER BELT DRIVE UNIT, INTERMEDIATE TRANSFER BELT, AND ROTATION DETECTION SENSOR |
| 0010002 | INTERMEDIATE TRANSFER BELT DRIVE UNIT HAS TRANSMITTED ABNORMALITY DETECTION SIGNAL | INTERMEDIATE TRANSFER BELT DRIVE UNIT AND INTERMEDIATE TRANSFER BELT |

FIG. 4

| ERROR OCCURRENCE DATE (501) | TOTAL PRINTED SHEET COUNT (502) | ERROR DETAILS CODE (401) | MAINTENANCE WORK FLAG (503) |
|---|---|---|---|
| 2021/4/17 | 235498 | 0010001 | 0 |
| 2021/4/17 | 235498 | 0010002 | 1 |
| 2021/4/18 | 235538 | 0010001 | 0 |
| 2021/4/18 | 235538 | 0010001 | 0 |

FIG. 5A

| ERROR OCCURRENCE DATE (501) | TOTAL PRINTED SHEET COUNT (502) | ERROR DETAILS CODE (401) | MAINTENANCE WORK FLAG (503) |
|---|---|---|---|
| 2021/4/17 | 235498 | 0010001 | 0 |
| 2021/4/18 | 235538 | 0010001 | 0 |
| 2021/4/18 | 235538 | 0010001 | 0 |

FIG. 5B

| 701 DATA ACQUISITION DATE | 502 TOTAL PRINTED SHEET COUNT | 702 DETECTION VALUE | 503 MAINTENANCE WORK FLAG |
|---|---|---|---|
| 2021/4/14 | 102345 | 10001 | 0 |
| 2021/4/15 | 102541 | 10005 | 0 |
| 2021/4/16 | 102730 | 10002 | 0 |
| 2021/4/17 | 103012 | 996 | 0 |
| 2021/4/18 | 103156 | 1000 | 0 |
| 2021/4/19 | 103498 | 993 | 0 |
| 2021/4/20 | 103984 | 1158 | 1 |
| 2021/4/21 | 104231 | 993 | 0 |

FIG. 7A

| 701 DATA ACQUISITION DATE | 502 TOTAL PRINTED SHEET COUNT | 702 DETECTION VALUE | 503 MAINTENANCE WORK FLAG |
|---|---|---|---|
| 2021/4/14 | 102345 | 10001 | 0 |
| 2021/4/15 | 102541 | 10005 | 0 |
| 2021/4/16 | 102730 | 10002 | 0 |
| 2021/4/17 | 103012 | 996 | 0 |
| 2021/4/18 | 103156 | 1000 | 0 |
| 2021/4/19 | 103498 | 993 | 0 |
| 2021/4/21 | 104231 | 993 | 0 |

FIG. 7B

INFORMATION PROCESSING APPARATUS AND IMAGE FORMING APPARATUS

BACKGROUND OF THE INVENTION

Field of the Invention

The present disclosure relates to a technology for deducing a cause of a failure in an image forming apparatus, such as a copying machine, a multi-function machine, a printer, or a facsimile machine.

Description of the Related Art

An image forming apparatus experiencing a failure is repaired by a customer engineer (hereinafter referred to as "CE") who visits a place in which the image forming apparatus is installed. How long it takes to identify a cause of the failure and finish correctly dealing with the failure varies depending on the CE's capability. A time required to repair the image forming apparatus consequently varies from one CE to another. In order to shorten the time required for the repair, a technology for deducing a cause of a failure based on in-machine data indicating a state of an image forming apparatus and notifying required processing has been proposed (Japanese Patent Application Laid-open No. 2017-017611). The in-machine data is information indicating a state inside the image forming apparatus, for example, a detected value of a sensor provided in the image forming apparatus, or error occurrence information.

When the image forming apparatus is in an irregular state different from a normal utilization state, a cause of a failure may not be accurately deduced with use of acquired in-machine data in some cases. For instance, a cause of a failure is not accurately deduced with the use of the in-machine data acquired when the CE is performing maintenance work. At the time of repair, the CE may temporarily install parts of another machine in the target machine and check how the target machine operates in order to identify the cause of the failure. The in-machine data acquired from the target machine at the time is not data about parts that are included in the target machine, but is data about the temporarily installed parts of the another machine. The data about the temporarily installed parts of the another machine may indicate behavior different from behavior indicated by data to be originally acquired from the target machine. This difference between the pieces of data hinders accurate deduction of the cause of the failure.

SUMMARY OF THE INVENTION

An information processing apparatus of the present disclosure communicates with an image forming apparatus that forms an image on a sheet, and includes: an acquisition unit configured to acquire error information about an error that has occurred in the image forming apparatus, and maintenance information about maintenance work performed on the image forming apparatus; a memory configured to store a plurality of pieces of error information acquired by the acquisition unit; and a controller configured to: determine, from the plurality of pieces of error information stored in the memory, based on the maintenance information, first error information about an error that has occurred during the maintenance work; determine an error part of the image forming apparatus based on second error information obtained by excluding the first error information from the plurality of pieces of error information stored in the memory; and output a result of the determination of the error part.

Further features of the present invention will become apparent from the following description of exemplary embodiments (with reference to the attached drawings).

BRIEF DESCRIPTION OF THE DRAWINGS

FIG. 4 is an explanatory table of error display.

FIG. 5A and FIG. 5B are tables for showing examples of in-machine data to be used for deduction of a cause of an error.

FIG. 7A and FIG. 7B are tables for showing examples of in-machine data to be used for another mode of deduction of a cause of an error.

DESCRIPTION OF THE EMBODIMENTS

Now, referring to the accompanying drawings, description is given of an exemplary embodiment of the present disclosure. The present disclosure is more specifically described with examples of carrying out the present disclosure, which are examples of the exemplary embodiment in the present disclosure. However, the present disclosure is not limited exclusively to configurations of those examples.

Configuration of Image Forming Apparatus

Figure 1:
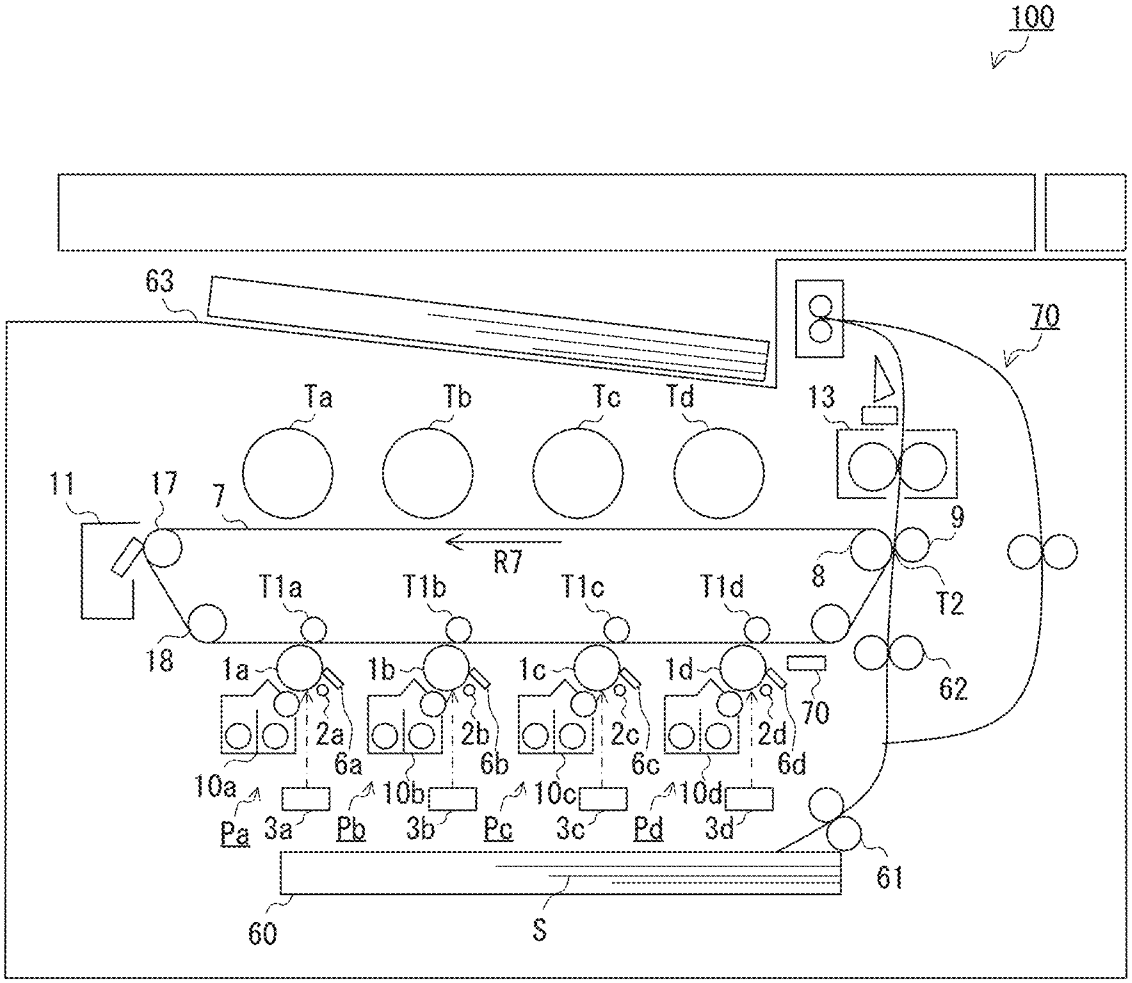
FIG. 1 is a configuration diagram of an image forming apparatus.

FIG. 1 is a configuration diagram of an image forming apparatus according to this embodiment. An image forming apparatus 100 according to this embodiment is a four-color full-color printer using electrophotography. The image forming apparatus 100 of FIG. 1 may be appropriately combined with another apparatus to be configured as a copying machine, a multi-function machine, or a facsimile machine.

The image forming apparatus 100 forms an image on a sheet S based on a print signal acquired from an external apparatus. The sheet S is a recording medium on which an image can be printed, and is, for example, plain paper, coated paper, an OHT sheet, a label, or the like. The image forming apparatus 100 converts the acquired print signal into image signals having been subjected to color separation into four colors of yellow (Y), magenta (M), cyan (C), and black (K). The image forming apparatus 100 charges a plurality of photosensitive members corresponding to the respective colors to a predetermined potential, and exposes the charged photosensitive members to light based on the image signals of the respective colors, to thereby form electrostatic latent images of colors corresponding to the respective photosensitive members. The image forming apparatus 100 develops the electrostatic latent images by using toners of the corresponding colors to form toner images on the respective photosensitive members, and transfers the toner images from the respective photosensitive members onto an intermediate transfer member by superimposing the toner images. The image forming apparatus 100 transfers the toner images from the intermediate transfer member onto the sheet S in a batch. The image forming apparatus 100 performs fixing processing by using thermocompression on the sheet S onto which the toner images have been transferred, and discharges the sheet S, as a printed product, to outside of the apparatus.

In order to perform the above-mentioned image forming processing, the image forming apparatus 100 includes parts or units, such as image forming units Pa to Pd, an intermediate transfer belt 7 that is the intermediate transfer member, and a fixing device 13. The image forming apparatus 100 is a tandem intermediate transfer system in which the image forming units Pa to Pd are arranged along the intermediate transfer belt 7. The intermediate transfer belt 7 is provided in an intermediate transfer belt frame (not shown), and is an endless belt stretched by a plurality of rollers including a drive roller 18, a tension roller 17, and a secondary transfer inner roller 8. The intermediate transfer belt 7 is conveyed (rotated) in an R7 direction by the drive roller 18. The image forming units Pa to Pd form toner images of different colors, respectively. In this embodiment, the image forming unit Pa forms a yellow (Y) toner image. The image forming unit Pb forms a magenta (M) toner image. The image forming unit Pc forms a cyan (C) toner image. The image forming unit Pd forms a black (K) toner image.

The image forming units Pa to Pd are different from each other only in colors being used, and have similar configurations and perform similar operation. In the following, description is given of the image forming unit Pa that forms a yellow toner image, and description of the image forming units Pb to Pd is omitted. Further, in the following description, "a" to "d" at the ends of the reference symbols are omitted unless a color is required to be distinguished in the description.

The image forming unit Pa has a configuration in which a photosensitive drum 1*a* that is the photosensitive member is provided at the center, and a charging device 2*a*, an exposure device 3*a*, a developing device 10*a*, a primary transfer portion T1*a*, and a drum cleaner 6*a* are arranged around the photosensitive drum 1*a*.

The photosensitive drum 1*a* includes a grounded conductor element tube having a cylindrical shape on which a photosensitive layer is formed, and is driven to be rotated clockwise about a drum shaft in the drawing. The charging device 2*a* has a shape of a roller, and includes an elastic layer formed around a conductive center shaft. The charging device 2*a* is urged toward the photosensitive drum 1*a*, to thereby rotate by following rotation of the photosensitive drum 1*a* while forming a nip between the charging device 2*a* and the photosensitive drum 1*a*. At that time, a charging bias is applied to the center shaft of the charging device 2*a* by a charging high-voltage power supply, and thus the charging device 2*a* uniformly charges the surface (photosensitive layer) of the photosensitive drum 1*a* to a predetermined potential.

The exposure device 3*a* is a laser scanner that performs scanning and exposure of laser light emitted from a laser emitting element on the photosensitive drum 1*a* in the drum shaft direction via a polygon mirror or an fθ optical system. The exposure device 3*a* modulates the laser light by using a drive signal generated based on an image signal. The modulated laser light is emitted to the photosensitive drum 1*a*. This causes a potential drop in a portion exposed to the laser light in the surface of the photosensitive drum 1*a*, and an electrostatic latent image corresponding to the image signal is formed on the surface of the photosensitive drum 1*a*.

The developing device 10*a* includes a container containing a two-component developer composed of a magnetic carrier and a non-magnetic toner, a development sleeve, and a regulating member placed at a predetermined distance from the development sleeve. The development sleeve includes a conductive member provided around a fixedly-placed magnet roller. The developer is stirred and conveyed in the container, and thus a toner is charged with predetermined electric charge. The charged developer is borne and conveyed on the development sleeve by a magnetic force of the magnet roller and rotation of the development sleeve, and it is adjusted to have a predetermined thickness by the regulating member. The developer having been adjusted to have the predetermined thickness on the development sleeve is supplied to the photosensitive drum 1*a*.

The supply of the developer to the photosensitive drum 1*a* is achieved by application of a development bias to the development sleeve by a development high-voltage power supply. When the development bias is applied to the development sleeve, an electromagnetic force is generated due to a potential difference between the electrostatic latent image formed on the photosensitive drum 1*a* and the development bias. By the electromagnetic force, the toner moves from the development sleeve to the photosensitive drum 1*a*. The toner having moved to the photosensitive drum 1*a* adheres to the electrostatic latent image and develops the electrostatic latent image into a toner image. In this embodiment, a toner having a negative polarity is used.

Meanwhile, in the developing device 10*a*, the container is repeatedly replenished with a yellow toner from a toner bottle Ta that is a replenishment container of the developer. This stabilizes an amount of a toner (toner density) in the developing device 10*a* to a predetermined reference amount. Thus, the developing device 10*a* can stabilize an amount of a toner that adheres to the photosensitive drum 1*a*. Likewise, a developing device 10*b* is replenished with a magenta toner from a toner bottle Tb. A developing device 10*c* is replenished with a cyan toner from a toner bottle Tc. A developing device 10*d* is replenished with a black toner from a toner bottle Td. In this embodiment, description is given of a two-component developer as an example, but the developer may be a one-component developer composed only of a magnetic toner or a non-magnetic toner. Also, in the case of a one-component developer, the developing device 10 is replenished with a toner from a toner bottle T, and an amount of a toner (toner density) contained therein is stabilized to the predetermined reference amount.

The primary transfer portion T1*a* includes a primary transfer roller in a position at which the primary transfer roller faces the photosensitive drum 1*a* with the intermediate transfer belt 7 interposed. The primary transfer roller is urged toward the photosensitive drum 1*a*, to thereby form a primary transfer nip between the photosensitive drum 1*a* and the intermediate transfer belt 7. A primary transfer bias having a polarity opposite to that of the toner is applied to the primary transfer roller, and thus the toner image on the photosensitive drum 1*a* is transferred onto the intermediate transfer belt 7. A part of the toner that remains un-transferred on the photosensitive drum 1*a* at that time is collected by the drum cleaner 6*a*. The photosensitive drum 1*a* from which the remaining toner has been collected by the drum cleaner 6*a* is again used to form an image.

The image forming units Pb to Pd perform processing similar to that performed by the image forming unit Pa, to thereby form toner images of their corresponding colors on photosensitive drums 1*b* to 1*d*. A magenta toner image is formed on the photosensitive drum 1*b*. A cyan toner image is formed on the photosensitive drum 1*c*. A black toner image is formed on the photosensitive drum 1*d*. The intermediate transfer belt 7 is driven to be rotated at a surface speed substantially equal to that of the photosensitive drums 1*a* to 1*d*. The toner images of the respective colors formed by the image forming units Pa to Pd are superimposed and transferred while being aligned to each other on the intermediate transfer belt 7 in accordance with the rotation speed of the intermediate transfer belt 7.

The image forming apparatus 100 includes a sheet feeding cassette 60, a sheet feeding roller pair 61, a registration roller pair 62, and a secondary transfer outer roller 9 along a conveying path on which the sheet S is conveyed, in order to feed the sheet S on which an image is to be formed. The secondary transfer outer roller 9 forms a secondary transfer portion T2 together with the secondary transfer inner roller 8. The sheet feeding cassette 60 stores therein a pile of sheets S. The sheets S are separated by friction by the sheet feeding roller pair 61 synchronously with image formation by the image forming units Pa to Pd, and they are fed and conveyed to the conveying path one by one. The sheet S is conveyed to the registration roller pair 62 via the conveying path. The registration roller pair 62 corrects a skew of the sheet S, and then conveys the sheet S to the secondary transfer portion T2 with adjusted timing.

At the secondary transfer portion T2, the secondary transfer outer roller 9 is urged toward the secondary transfer inner roller 8 with the intermediate transfer belt 7 interposed, to thereby form a secondary transfer nip between the secondary transfer outer roller 9 and the intermediate transfer belt 7. The secondary transfer outer roller 9 rotates by following rotation of the intermediate transfer belt 7. The sheet S supplied to the secondary transfer portion T2 is conveyed while being held between the secondary transfer outer roller 9 and the secondary transfer inner roller 8 of the secondary transfer nip. At that time, a secondary transfer bias having a polarity opposite to that of the toner is applied to the secondary transfer outer roller 9, and thus the toner image on the intermediate transfer belt 7 is transferred onto the sheet S. A part of the toner that remains un-transferred on the intermediate transfer belt 7 is collected by a belt cleaner 11 placed so as to face the tension roller 17 with the intermediate transfer belt 7 interposed. The intermediate transfer belt 7 from which the remaining toner has been collected by the belt cleaner 11 is again used to form an image.

The sheet S onto which the toner image has been transferred is conveyed to the fixing device 13 by the secondary transfer outer roller 9. The fixing device 13 includes a roller pair having a built-in heater, and it melts the toner image to fix the toner image onto the sheet S by thermocompression. The multi-color toner image produces colors during the melting fixation to be a full-color image. The fixing device 13 includes a heater serving as a heat source and is controlled such that an optimum temperature (fixation temperature) is always kept. The sheet S onto which the full-color image has been fixed is discharged onto a sheet discharge tray 63, as a printed product.

In the case of double-side printing, the sheet S in which an image has been printed on one of both surfaces is conveyed to the registration roller pair 62 by a reversing conveying mechanism 70. At that time, a surface of the sheet S on which an image is to be printed is reversed. As a result of the reversal, in the sheet S conveyed from the registration roller pair 62 to the secondary transfer portion T2, an image is formed on the other of the surfaces. In this manner, the image forming apparatus 100 can form an image based on a print signal on a sheet.

Control Unit

Figure 2:
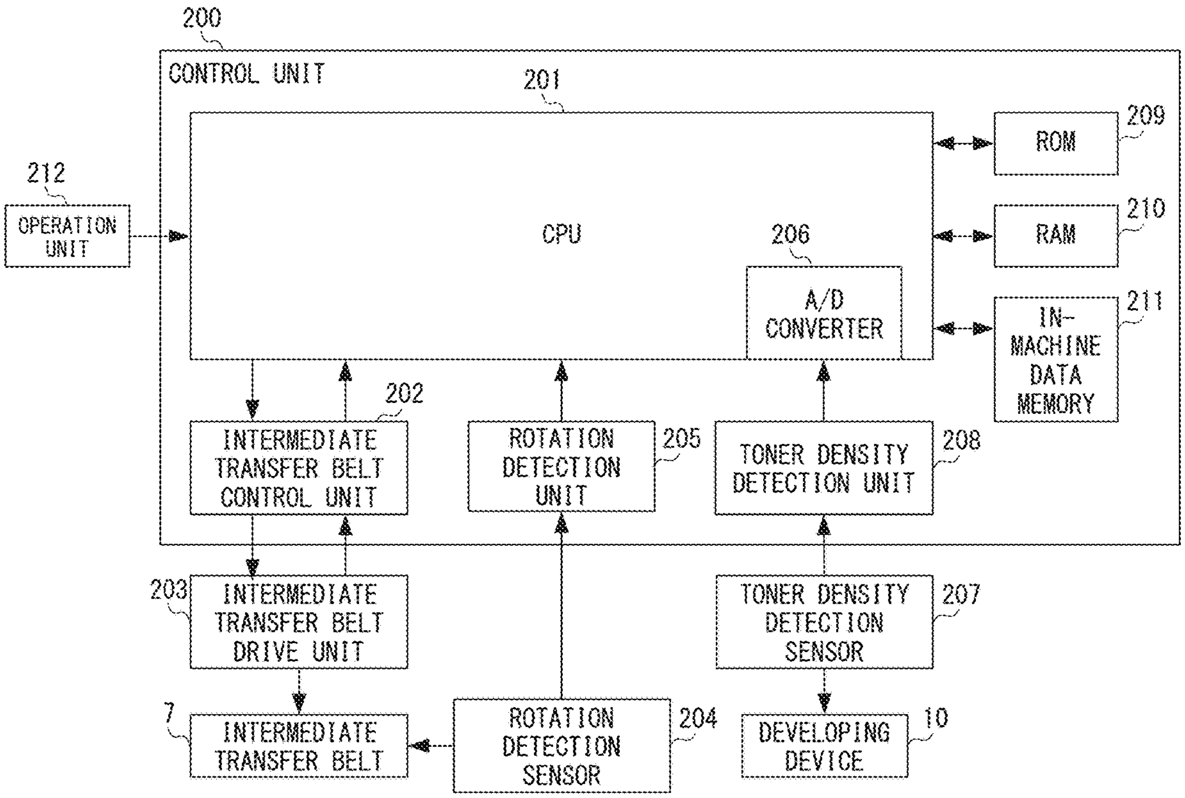
FIG. 2 is a configuration diagram of a control unit.

FIG. 2 is a configuration diagram of a control unit for controlling operation of the image forming apparatus 100. A control unit 200 controls overall operation of the image forming apparatus 100. The control unit 200 includes a central processing unit (CPU) 201, a read-only memory (ROM) 209, and a random access memory (RAM) 210. The control unit 200 also includes an intermediate transfer belt control unit 202, a rotation detection unit 205, a toner density detection unit 208, and an in-machine data memory 211, which are connected to the CPU 201. An operation unit 212 is connected to the CPU 201. An intermediate transfer belt drive unit 203 for driving the intermediate transfer belt 7 to rotate is connected to the intermediate transfer belt control unit 202. A rotation detection sensor 204 for detecting rotation of the intermediate transfer belt 7 is connected to the rotation detection unit 205. A toner density detection sensor 207 for detecting a density of a toner contained in each developing device 10 is connected to the toner density detection unit 208.

The CPU 201 is a controller for controlling the operation of the image forming apparatus 100 by executing a computer program stored in the ROM 209. The RAM 210 is a work memory used when the CPU 201 executes processing. The CPU 201 controls units of the image forming apparatus 100 by executing the computer program. For example, the CPU 201 controls the units so that a full-color toner image based on a print signal is transferred and fixed onto the sheet S, to thereby form a full-color image on the sheet S.

The in-machine data memory 211 is a storage device in which in-machine data of the image forming apparatus 100 is accumulated. The in-machine data is, for example, data indicating an internal state of the image forming apparatus 100, such as a counter value indicating an operation state, a date/time, a sensor detection value (detection information), and error occurrence information (error information).

The intermediate transfer belt drive unit 203 is a drive source for driving the drive roller 18. The intermediate transfer belt 7 is driven to rotate by the driving of the drive roller 18. The intermediate transfer belt drive unit 203 is supplied with a current from the intermediate transfer belt control unit 202 under control of the CPU 201, and it is thus driven to rotate the intermediate transfer belt 7. The intermediate transfer belt drive unit 203 transmits an abnormality detection signal to the intermediate transfer belt control unit 202 when occurrence of a failure causes a drive load (a drive load of the drive roller 18 and the intermediate transfer belt 7) to exceed a predetermined load amount, with the result that rotation is no longer possible. The abnormality detection signal is transmitted from the intermediate transfer belt control unit 202 to the CPU 201.

The CPU 201 receives the abnormality detection signal from the intermediate transfer belt control unit 202, determines that a failure has occurred, and executes error display in the operation unit 212. At the same time, the CPU 201 accumulates, as the error occurrence information (error information), in the in-machine data memory 211, an error details code (an error code) assigned in advance to a type of the error, a date/time of occurrence of the error, and a counter value indicating an operation state of the image forming apparatus 100.

The rotation detection sensor 204 is, in this embodiment, a photosensor for detecting a rotation state of the intermediate transfer belt 7. The rotation detection sensor 204 is not limited to a photosensor, and it may have any configuration of a detection device as long as the detection device is capable of detecting that the intermediate transfer belt 7 is rotating. The rotation detection sensor 204 detects that the intermediate transfer belt 7 is rotating, and transmits a detection signal to the rotation detection unit 205. The rotation detection unit 205 transmits a detection result acquired from the rotation detection sensor 204 to the CPU 201.

The CPU 201 transmits a drive signal to the intermediate transfer belt control unit 202 and, during a period in which the intermediate transfer belt 7 is being driven by the intermediate transfer belt drive unit 203, acquires the detection result of the rotation detection sensor 204. When the detection result of the rotation detection sensor 204 indicates that no rotation of the intermediate transfer belt 7 has been detected during a period in which the drive signal is transmitted to the intermediate transfer belt control unit 202, the CPU 201 determines that a failure has occurred, and executes error display in the operation unit 212. At the same time, the CPU 201 accumulates, as the error occurrence information (error information), in the in-machine data memory 211, an error details code (an error code) assigned in advance to a type of the error, a date/time of occurrence of the error, and a counter value indicating an operation state of the image forming apparatus 100.

The toner density detection sensor 207 may have any configuration as long as the configuration allows the toner density detection sensor 207 to detect an amount of a toner contained in each developing device 10. For example, the toner density detection sensor 207 outputs a signal (detection signal) indicating magnetic permeability, which changes depending on the amount of the toner contained in each developing device 10. The toner density detection sensor 207 transmits the detection signal to the toner density detection unit 208.

The toner density detection unit 208 transmits the detection signal acquired from the toner density detection sensor 207 to an A/D converter 206 of the CPU 201. The A/D converter 206 takes in, in time series, the detection signal transmitted from the toner density detection unit 208, and performs A/D conversion on the detection signal taken in.

The CPU 201 uses an arithmetic expression stored in advance in the ROM 209 and the detection signal converted through the A/D conversion by the A/D converter 206 to execute calculation for detecting the toner density in each developing device 10. The CPU 201 determines whether the detected toner density reaches an objective value set in advance. When the detected toner density falls short of the objective value, the CPU 201 drives the relevant toner bottle T to replenish this developing device 10 with the toner. The CPU 201 also accumulates the in-machine data in the in-machine data memory 211 at predetermined timing set in advance. The detection information as the in-machine data accumulated here includes a date/time of acquisition of a detection result of the toner density detection sensor 207, a counter value indicating an operation state of the image forming apparatus 100 at the time of acquisition, and the detection result (sensor detection result) of the toner density detection sensor 207. The timing at which the detection information is accumulated in the in-machine data memory 211 is set in advance by taking into consideration both of a storage capacity of the in-machine data memory 211 and a desired interval of monitoring of the state.

When the detection result of a toner amount in one developing device 10 deviates from a range set in advance, the CPU 201 determines that a failure has occurred. The CPU 201 determines that a failure has occurred also when an amount of change of the detection result of the toner amount in one developing device 10 within a period set in advance exceeds a threshold value set in advance. When it is determined that a failure has occurred, the CPU 201 executes error display in the operation unit 212. At the same time, the CPU 201 stores, as the error information, in the in-machine data memory 211, an error details code assigned in advance to a type of the error, a date/time of occurrence of the error, and a counter value indicating an operation state of the image forming apparatus 100.

The operation unit 212 is a user interface including an input interface and an output interface. The input interface is a key button, a touch panel, or the like. The output interface is a display, a speaker, or the like. The operation unit 212 displays an image on the display under the control of the CPU 201. For example, the operation unit 212 displays an error on the display under the control of the CPU 201. A CE can use the input interface of the operation unit 212 to issue an instruction indicating a start of the maintenance work of the image forming apparatus 100. When an instruction indicating the start of the maintenance work is issued via the input interface, the operation unit 212 notifies the start of the maintenance work to the CPU 201.

The CPU 201 determines that maintenance work has started based on the notification of the start of maintenance work from the operation unit 212. When the CPU 201 determines that maintenance work has started, an operation mode shifts to a maintenance mode. For the duration of the maintenance mode, the CPU 201 stores a maintenance work flag indicating that in-machine data is data acquired during maintenance work, along with the in-machine data, when the in-machine data is accumulated in the in-machine data memory 211. The maintenance work flag is used in error cause deduction described later to determine whether in-machine data accumulated in the in-machine data memory 211 is data acquired during execution of maintenance work.

The CE can use the operation unit 212 to issue an instruction indicating an end of the maintenance work of the image forming apparatus 100. When an instruction indicates the end of the maintenance work, the operation unit 212 notifies the end of the maintenance work to the CPU 201. The CPU 201 determines that the maintenance work has ended based on this notification from the operation unit 212. When the CPU 201 determines that the maintenance work has ended, the operation mode shifts from the maintenance mode to a normal mode.

A basis of determination that maintenance work is being executed is not limited to input from the operation unit 212, and any method is employable as long as it can be determined that maintenance work is being executed. For example, the CPU 201 may execute the shift of the operation mode to the maintenance mode based on communication from a tablet terminal carried around by the CE, or the like. The CPU 201 may execute the shift of the operation mode to the maintenance mode based also on a detection result of a sensor (not shown) provided in the image forming apparatus 100, such as a sensor for detecting an opened state of a panel on the image forming apparatus 100. The sensor in this case detects a state of a part that changes states at a time of maintenance inspection of the image forming apparatus 100.

Accumulation of In-Machine Data

Figure 3:
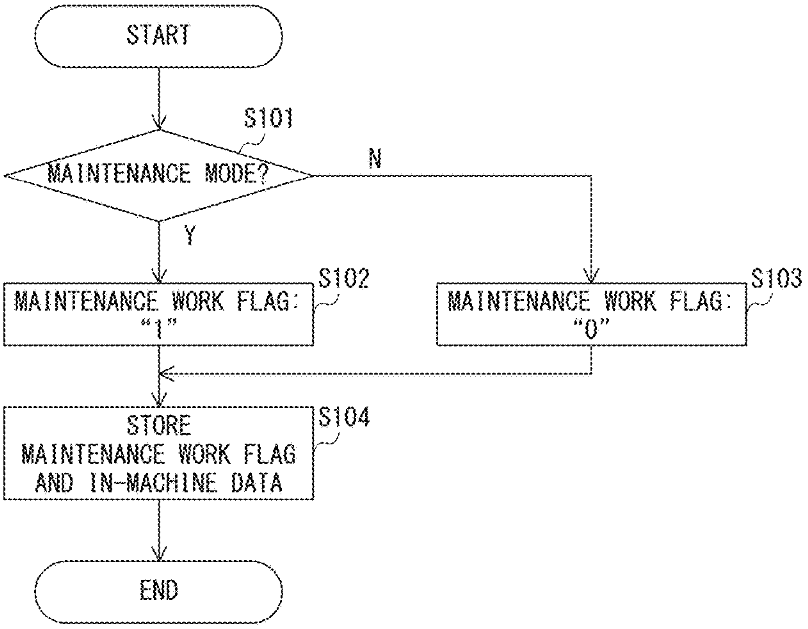
FIG. 3 is a flow chart for illustrating in-machine data accumulation processing.

FIG. 3 is a flow chart for illustrating in-machine data accumulation processing. Accumulation of in-machine data is executed at timing determined in advance for each type of in-machine data. For example, the error information is accumulated at the time of occurrence of an error. The error information specifically includes an error details code indicating contents of the error, a date/time of occurrence of the error, and information about the total number of printed sheets at the time of occurrence of the error. In a case of the detection information, a sensor detection value acquired at a predetermined accumulation interval is accumulated. The predetermined accumulation interval may be defined in the form of time, or in the form of the total number of printed sheets or the number of times of execution of a print job.

The accumulation interval of the detection information that is too long may lower precision of error cause deduction due to a shortage of data. The accumulation interval of the detection information that is too short leads to an increase in data amount, and a large-capacity memory required for the increased data amount increases cost. A desired length of the accumulation interval of the detection information is accordingly as long as possible within a range in which precision of error cause deduction is ensured. In this embodiment, a detection value of the toner density detection sensor 207 is accumulated daily.

When in-machine data is acquired, the CPU 201 determines whether the operation mode of the image forming apparatus 100 has shifted to the maintenance mode (Step S101). The shift to the maintenance mode is executed based on, as described above, an instruction issued via the operation unit 212, a detection result of a sensor, or the like. When the operation mode is the maintenance mode (Step S101: Y), the CPU 201 sets "1" to the maintenance work flag (Step S102). When the operation mode is not the maintenance mode (Step S101: N), the CPU 201 sets "0" to the maintenance work flag (Step S103). The CPU 201 stores the acquired in-machine data in the in-machine data memory 211 in association with the set maintenance work flag (Step S104). With completion of the steps described above, the CPU 201 ends the in-machine data accumulation processing.

Error Display

FIG. 4 is an explanatory table of error display to be displayed on the display of the operation unit 212 when an error is detected. The error display includes an error details code 401, detection contents 402 of the error, and an error cause 403 of the error.

An error details code "0010001" indicates an error in which the rotation detection sensor 204 cannot detect rotation of the intermediate transfer belt 7 despite the intermediate transfer belt drive unit 203 being driven. An error details code "0010002" indicates an error informed by transmission of the abnormality detection signal from the intermediate transfer belt drive unit 203. The intermediate transfer belt drive unit 203 transmits the abnormality detection signal when the drive load exceeds a threshold value set in advance.

Major error causes for the error of the error details code "0010001" are possibly the following three factors. The first is a case in which a failure of the rotation detection sensor 204 renders rotation of the intermediate transfer belt 7 undetectable. The second is a case in which the intermediate transfer belt 7 does not rotate due to a failure of the intermediate transfer belt drive unit 203. The third is a case in which something is wrong with the intermediate transfer belt 7 and the intermediate transfer belt 7 does not rotate despite the driving of the intermediate transfer belt drive unit 203. Major error causes for the error of the error details code "0010002" are possibly the following two factors. The first is a case in which a failure of the intermediate transfer belt drive unit 203 renders the intermediate transfer belt 7 unable to rotate. The second is a case in which something is wrong with the intermediate transfer belt 7 and the intermediate transfer belt 7 does not rotate despite the driving of the intermediate transfer belt drive unit 203.

A relationship between an error cause and occurrence of an error is described with specific examples. For example, in a case in which a heavy drive load is caused by a trouble with the intermediate transfer belt 7, when the intermediate transfer belt 7 is rotating even by the slightest amount, the rotation is detected by the rotation detection sensor 204 but the intermediate transfer belt drive unit 203 detects the abnormality detection signal. For that reason, a phenomenon in which the error of the error details code "0010001" does not occur but the error of the error details code "0010002" occurs may happen.

To give another example, in a case in which a drive force is no longer transmitted to the intermediate transfer belt 7 due to a failure in the intermediate transfer belt drive unit 203, the drive load of the intermediate transfer belt drive unit 203 becomes lighter rather than heavier. The error of the error details code "0010002" accordingly does not occur. However, the intermediate transfer belt 7 stops rotating, which causes the error of the error details code "0010001."

A failure state may change when a relevant part is driven. Accordingly, which error occurs may change when the intermediate transfer belt drive unit 203 and the intermediate transfer belt 7 are kept in operation.

Error Cause Deduction

FIG. 5A and FIG. 5B are tables for showing examples of the in-machine data (the error information) to be used for deduction of a cause of an error. For simplicity, in FIG. 5A and FIG. 5B, instead of an error occurrence date/time, an error occurrence date is shown. Here, the error information includes an error occurrence date 501, a total printed sheet count 502 (the cumulative number of pages printed by the image forming apparatus 100) of the image forming apparatus 100 at the time of occurrence of the error, and the error details code 401 of the error that has occurred. The error information is associated with a maintenance work flag 503.

In error cause deduction using the error information, a cause of an error is deduced based on a history of past errors. For example, when the error of the error details code "0010001" occurs and attention is paid to the error of the error details code "0010001" alone, the cause of the failure resides in one of the intermediate transfer belt drive unit 203, the intermediate transfer belt 7, and the rotation detection sensor 204. However, possible error causes can be narrowed down by referring to the history of past errors in addition to the most recent error of the error details code "0010001." The error cause of the error of the error details code "0010002" resides in the intermediate transfer belt drive unit 203 or the intermediate transfer belt 7. Accordingly, when it is found out that the error of the error details code "0010002" has occurred in the past, and only one part, not two parts, is experiencing a failure, it can be deduced that nothing is wrong with the rotation detection sensor 204.

In the error information shown as an example in FIG. 5A, when no attention is paid to the maintenance work flag 503, it is deduced that one of the intermediate transfer belt drive unit 203 and the intermediate transfer belt 7 is experiencing a failure, because the error of the error details code "0010002" has occurred. In actuality, however, the error of the error details code "0010002" has occurred during maintenance work. The error may have accordingly occurred due to irregular operation. For example, there is a case in which the image forming apparatus 100 is dismantled and test drive of the intermediate transfer belt drive unit 203 is executed with the intermediate transfer belt 7 unable to rotate. In this case, the error of the error details code "0010002" may have occurred despite the fact that nothing is wrong with the intermediate transfer belt drive unit 203 and the intermediate transfer belt 7. Error cause deduction that does not pay attention to the maintenance work flag thus has a possibility of wrong deduction of the cause of the error.

In this embodiment, attention is paid to the maintenance work flag 503, and an error cause is deduced based on pieces of error information that remain after excluding every piece of error information acquired in the maintenance mode (first error information which has "1" as a value of the maintenance work flag 503) (the remaining error information is referred to as "second error information"). In the example of FIG. 5B, the piece of error information acquired in the maintenance mode (the first error information) is excluded from the example of FIG. 5A and, consequently, the error of the error details code "0010001" is the only error that has occurred. In this case, it is deduced that one of the intermediate transfer belt drive unit 203, the intermediate transfer belt 7, and the rotation detection sensor 204 is experiencing a failure.

As described above, the result of error cause deduction may change when the cause of the error is deduced by excluding the error information acquired during execution of maintenance work (the first error information). With the error information of a period of execution of maintenance work (the first error information) excluded, error cause deduction excluding error information of a period of an irregular state (the first error information) is executed. This prevents the precision of error cause deduction from dropping.

Figure 6:
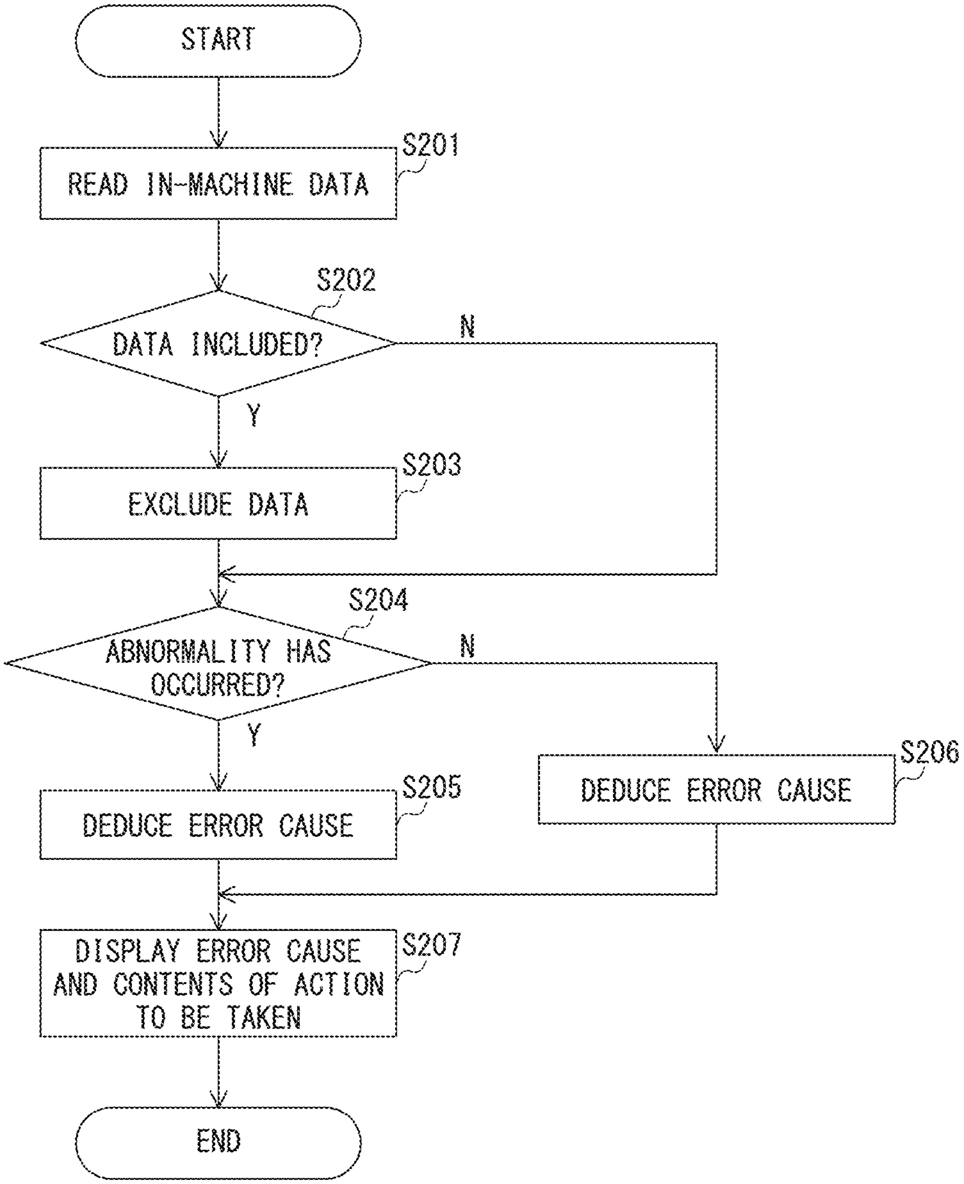
FIG. 6 is a flow chart for illustrating error cause deduction processing.

FIG. 6 is a flow chart for illustrating error cause deduction processing. Here, a case of deducing a cause of an error related to driving and rotation detection of the intermediate transfer belt 7 is described. Execution of the error cause deduction processing is triggered by, for example, an instruction from the operation unit 212. As another example, the error cause deduction processing may be executed automatically for every predetermined length of time, or at predetermined timing such as each time printing is executed. In the case of automatic execution, a result of the execution may be stored in the in-machine data memory 211.

The CPU 201 reads a plurality of accumulated pieces of in-machine data out of the in-machine data memory 211 (Step S201). The in-machine data read by the CPU 201 here is, for example, the plurality of pieces of error information of FIG. 5A. The CPU 201 determines whether the plurality of read pieces of error information include error information acquired in the maintenance mode (the first error information) (Step S202). The CPU 201 checks the maintenance work flag 503 associated with a read piece of error information and, when the maintenance work flag 503 is "1," determines that this piece of error information is the first error information acquired in the maintenance mode. When a read piece of error information has "0" as the value of the maintenance work flag 503, the CPU 201 determines this piece of error information to be the second error information, which is acquired in a mode other than the maintenance mode.

When the read pieces of error information include the first error information acquired in the maintenance mode (Step S202: Y), the CPU 201 excludes the first error information acquired in the maintenance mode from the plurality of pieces of error information (Step S203). The second error information of FIG. 5B is obtained by excluding the first error information acquired in the maintenance mode from the plurality of pieces of error information. The CPU 201 determines, from the second error information in which the first error information acquired in the maintenance mode is excluded, whether an error (abnormality) has occurred (Step S204). When the plurality of read pieces of error information do not include the first error information acquired in the maintenance mode (Step S202: N), the CPU 201 determines whether an error (abnormality) has occurred from the error information acquired in the processing step of Step S201 (the second error information), without executing exclusion of error information (Step S204).

Here, the CPU 201 determines whether the error of the error details code "0010002" has occurred in the intermediate transfer belt drive unit 203 within a predetermined period. The predetermined period is a range of error information to be used for error cause (error part) deduction, and is defined in the form of, for example, the number of days or the total number of printed sheets. The predetermined period that is long may undesirably include a past solved error, and the predetermined period that is short has a possibility of a drop in the precision of error cause deduction due to smallness of the data amount. Accordingly, the predetermined period is set in advance to a length of a period appropriate for contents of the error. In this embodiment, a period in which the total number of printed sheets is equal to or less than 1,000 sheets is set as the predetermined period.

In a case in which the error of the error details code "0010002" has occurred in the intermediate transfer belt drive unit 203 within the predetermined period (Step S204: Y), the CPU 201 deduces the cause of the error (Step S205). In this embodiment, the CPU 201 determines the cause of the error (a candidate for the error part) to be the intermediate transfer belt drive unit 203 or the intermediate transfer belt 7.

In a case in which the error of the error details code "0010002" has not occurred in the intermediate transfer belt drive unit 203 within the predetermined period (Step S204: N), the CPU 201 deduces the cause of the error (Step S206). In this embodiment, the CPU 201 determines the cause of the error (candidates for the error part) to be the intermediate transfer belt drive unit 203, the intermediate transfer belt 7, and the rotation detection sensor 204.

Once determining the candidate(s) for the error part, the CPU 201 displays the error cause and contents of an action to be taken on the display of the operation unit 212, based on the result of the determination (Step S207). Specifically, the CPU 201 displays a part experiencing a failure (the error part) and an instruction to replace the part (the contents of an action to be taken). This concludes the error cause deduction processing.

FIG. 7A and FIG. 7B are tables for showing examples of in-machine data (detection information) to be used for another mode of deduction of a cause of an error. For simplicity, in FIG. 7A and FIG. 7B, instead of an error occurrence date/time, an error occurrence date is shown. In FIG. 7A and FIG. 7B, an error cause is deduced based on a sensor detection value. Here, the in-machine data (detection information) includes a date 701 at which a detection value of the toner density detection sensor 207 has been acquired, the total printed sheet count 502 of the image forming apparatus 100 at the time of acquisition of the detection value of the toner density detection sensor 207, and a detection value 702 of the toner density detection sensor 207. The detection information is associated with the maintenance work flag 503.

Detection of the toner density in each developing device 10 and toner replenishing operation are described. When the toner in one developing device 10 is consumed by image forming, the detection value 702 of the toner density detection sensor 207 changes depending on the consumed amount. The CPU 201 determines how much the toner amount in this developing device 10 has decreased from the detection value 702 of the toner density detection sensor 207. When the toner amount in this developing device 10 decreases to a level lower than a predetermined threshold value, the CPU 201 drives the relevant toner bottle T to replenish this developing device 10 with the toner. Through the detection of the toner density in each developing device 10 and the toner replenishing operation executed in this manner, the detection value 702 of the toner amount in each developing device 10 which is detected by the toner density detection sensor 207 is controlled so as to be contained within a predetermined range. In this embodiment, the detection value 702 of the toner amount in each developing device 10 which is detected by the toner density detection sensor 207 is controlled so as to be contained within a range between 900 and 1,100.

In the error cause deduction processing, whether one developing device 10 is experiencing a failure is deduced by determining whether the detection value 702 of the toner density detection sensor 207 is within the range between 900 and 1,100. In the example of FIG. 7A, a maximum value of the detection value 702 of the toner density detection sensor 207 when no attention is paid to the maintenance work flag 503 is "1,158" and is outside the range between 900 and 1,100. It is consequently deduced in this case that this developing device 10 is experiencing a failure.

In actuality, however, the detection value 702 that is "1,158" is a value detected during maintenance work, and the error may have occurred due to irregular operation. For example, there can be a case in which printing is executed with one developing device 10 of the image forming apparatus 100 replaced by a developing device of another image forming apparatus, and the detection value 702 of the toner density detection sensor 207 is acquired in this situation. In maintenance work of the image forming apparatus 100, when there is abnormality, the CE often replaces a part in order to isolate the cause of the error. When a sensor detection value acquired with a part replaced is used, the detection value is associated with another part and may accordingly hinder accurate deduction of the cause of the error.

When attention is paid to the maintenance work flag 503 and detection information acquired in the maintenance mode (first detection information) is excluded as shown in FIG. 7B, the detection value 702 (second detection information) of the toner density detection sensor 207 is now from 993 to 1,005. This is within the range between 900 and 1,100, and it is deduced that this developing device 10 is not experiencing a failure. As described above, a failure of each developing device 10 can correctly be deduced by excluding the first detection information acquired during execution of maintenance work from a plurality of pieces of detection information.

Figure 8:
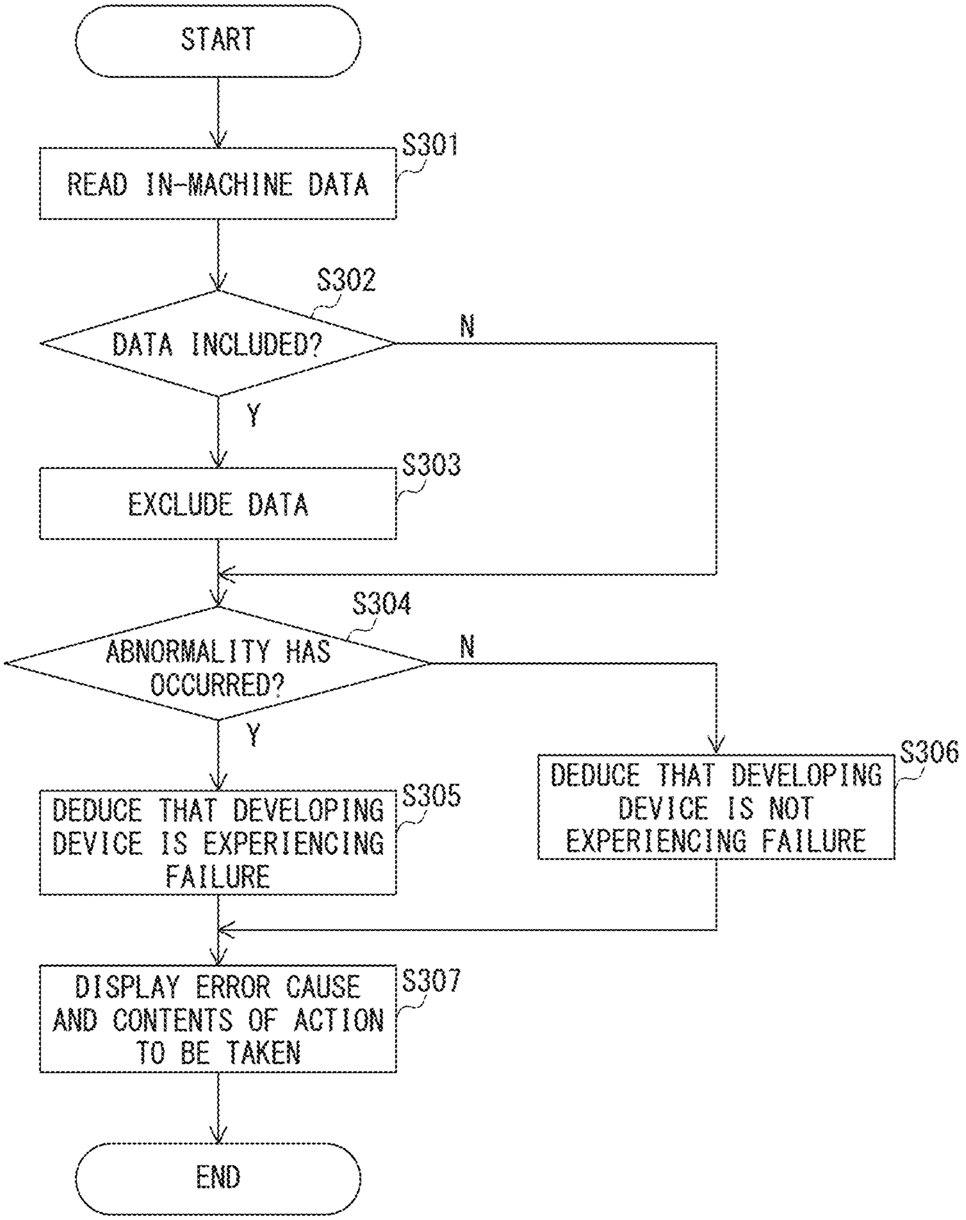
FIG. 8 is a flow chart for illustrating error cause deduction processing.

FIG. 8 is a flow chart for illustrating the error cause deduction processing. This processing is to deduce whether there is a failure in one developing device 10 based on the detection value 702 of the toner density detection sensor 207. Execution of the processing of deducting whether there is a failure is triggered by, for example, an instruction from the operation unit 212. As another example, the processing of deducting whether there is a failure may be executed automatically for every predetermined length of time, or at predetermined timing such as each time printing is executed. In the case of automatic execution, a result of the execution may be stored in the in-machine data memory 211.

The CPU 201 reads a plurality of accumulated pieces of in-machine data out of the in-machine data memory 211 (Step S301). The in-machine data read by the CPU 201 here is, for example, the plurality of pieces of detection information of FIG. 7A. The CPU 201 determines whether the plurality of read pieces of detection information include first detection information acquired in the maintenance mode (Step S302). The CPU 201 checks the maintenance work flag 503 associated with a read piece of detection information and, when the maintenance work flag 503 is "1," determines that this piece of detection information is the first detection information acquired in the maintenance mode. When a read piece of detection information has "0" as the value of the maintenance work flag 503, the CPU 201 determines this piece of detection information to be the second detection information, which is acquired in a mode other than the maintenance mode.

When the read pieces of detection information include the first detection information acquired in the maintenance mode (Step S302: Y), the CPU 201 excludes the first detection information acquired in the maintenance mode from the plurality of pieces of detection information (Step S303). The second detection information of FIG. 7B is obtained by excluding the first detection information acquired in the maintenance mode from the plurality of pieces of detection information. The CPU 201 determines, from the second detection information in which the first detection information acquired in the maintenance mode is excluded from the plurality of pieces of detection information, whether an error (abnormality) has occurred (Step S304). When the plurality of read pieces of detection information do not include the first detection information acquired in the maintenance mode (Step S302: N), the CPU 201 determines whether an error (abnormality) has occurred from the detection information acquired in the processing step of Step S301, without executing exclusion of detection information (Step S304).

In Step S304, the CPU 201 determines whether there is abnormality by determining whether the detection value 702 detected by the toner density detection sensor 207 in a predetermined period is within a predetermined range (between 900 and 1,100). The predetermined period is a data range of the in-machine data to be used for error cause deduction, and is defined in the form of, for example, the number of days or the total number of printed sheets. The predetermined period that is long may undesirably include a past solved error, and the predetermined period that is short has a possibility of a drop in the precision of error cause deduction due to smallness of the data amount. Accordingly, the predetermined period is set in advance to a length of a period appropriate for contents of the error. In this embodiment, 1 week is set as the predetermined period.

When there is detection information in which the detection value 702 of the toner density detection sensor 207 in the predetermined period is outside the range between 900 and 1,100, the CPU 201 determines that there is abnormality (Step S304: Y). In this case, the CPU 201 deduces that this developing device 10 is experiencing a failure (Step S305). When the detection value 702 of the toner density detection sensor 207 in the predetermined period is within the range between 900 and 1,100, the CPU 201 determines that there is no abnormality (Step S304: N). In this case, the CPU 201 deduces that this developing device 10 is not experiencing a failure (Step S306).

Once deducing the error cause, the CPU 201 displays the error cause and contents of an action to be taken on the display of the operation unit 212, based on the result of the deduction. (Step S307). Specifically, when it is deduced that this developing device 10 is experiencing a failure, the CPU 201 displays a message to the effect that this developing device 10 is experiencing a failure and an instruction to replace this developing device 10. When it is deduced that this developing device 10 is not experiencing a failure, the CPU 201 displays a message indicating that this developing device 10 is operating normally. This concludes the processing of deducing whether there is a failure in one developing device 10.

MODIFICATION EXAMPLE

In the example described above, in-machine data is accumulated in the in-machine data memory 211, and an error cause is deduced based on the accumulated in-machine data. Those steps of processing are performed in the image forming apparatus 100. In a modification example of the present disclosure, a case in which those steps of processing are performed in an information processing apparatus provided externally to the image forming apparatus 100 is described. Here, description is given of a case in which an information processing apparatus connected to the image forming apparatus 100 via a network performs the processing.

Figure 9:
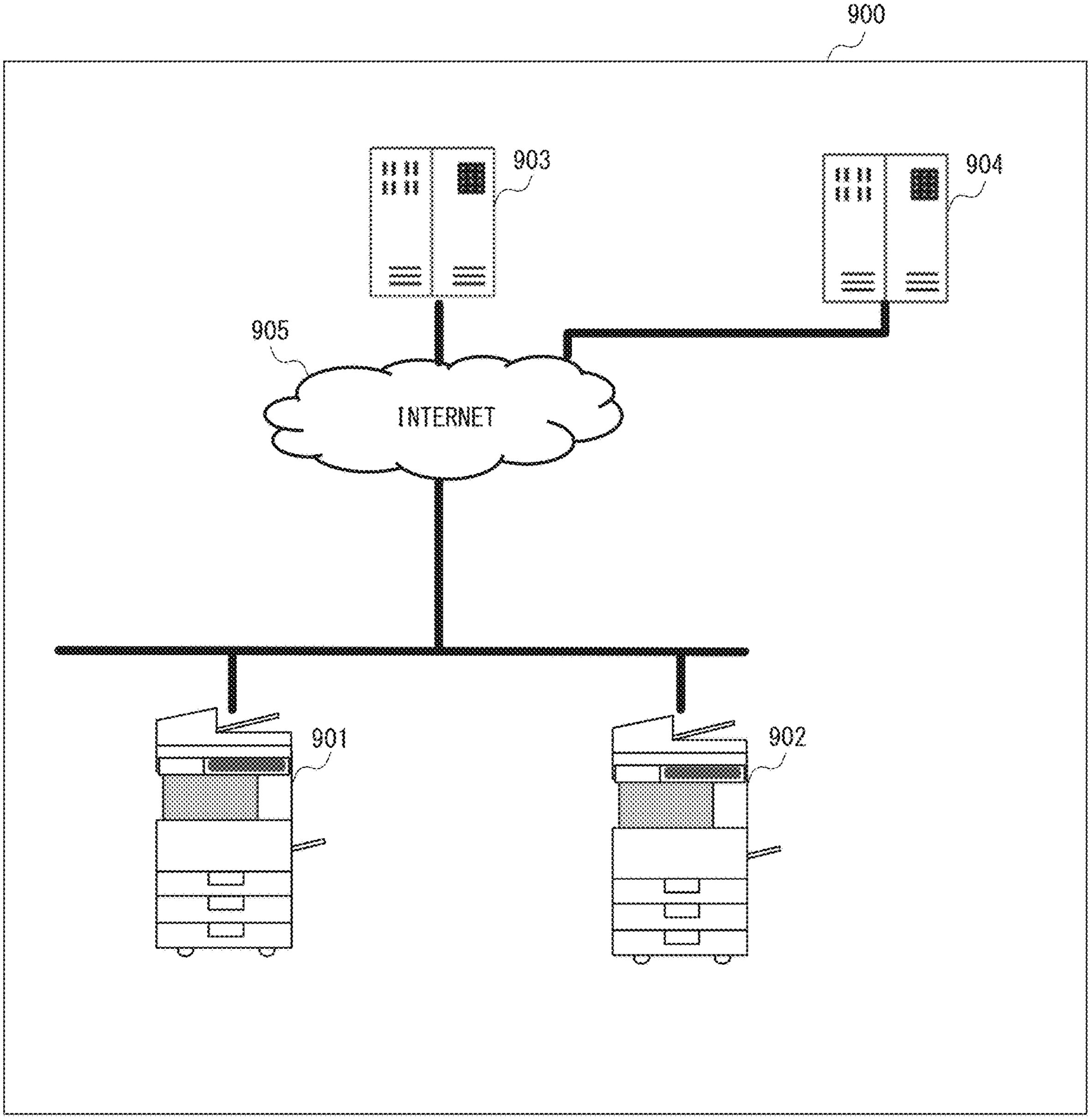
FIG. 9 is a configuration diagram of an error cause deduction system.

FIG. 9 is a configuration diagram of an error cause deduction system for deducing a cause of an error of the image forming apparatus 100 with an external information processing apparatus. An error cause deduction system 900 incudes one or more image forming apparatus 901 and 902, a server 903, and a management apparatus 904. Here, two image forming apparatus 901 and 902 are provided in the error cause deduction system 900. The image forming apparatus 901 and 902 each have a configuration in which a network interface is added to the image forming apparatus 100, and create a printed product by forming an image on the sheet S. The server 903 and the management apparatus 904 function as information processing apparatus for deducing a cause of an error based on in-machine data.

The image forming apparatus 901 and 902, the server 903, and the management apparatus 904 are capable of communicating to and from each other via a network. Here, the network is an Internet 905. The network may be a telecommunication line, such as a local area network (LAN) or a wide area network (WAN). The error cause deduction system 900 collects in-machine data from each of the image forming apparatus 901 and 902 and deduces a cause of an error in each of the image forming apparatus 901 and 902 based on the collected in-machine data.

Each of the image forming apparatus 901 and 902 accumulates, in the in-machine data memory 211 provided therein, in-machine data associated with the maintenance work flag 503 through the processing of FIG. 3. The image forming apparatus 901 and 902 each periodically transmit the accumulated in-machine data and maintenance work flag 503 to the server 903.

The server 903 accumulates therein the in-machine data and maintenance work flag 503 acquired from each of the image forming apparatus 901 and 902 for each of the image forming apparatus 901 and 902. For example, the server 903 assigns identification information for identifying a source of acquisition to the acquired in-machine data and maintenance work flag 503, and it accumulates therein the in-machine data and maintenance work flag 503. As another example, the server 903 prepares in advance a storage area for each of the image forming apparatus 901 and 902, and it accumulates the acquired in-machine data and maintenance work flag 503 in a corresponding storage area. The server 903 transmits the accumulated in-machine data and maintenance work flag 503 to the management apparatus 904 in response to a request from the management apparatus 904.

Figure 10:
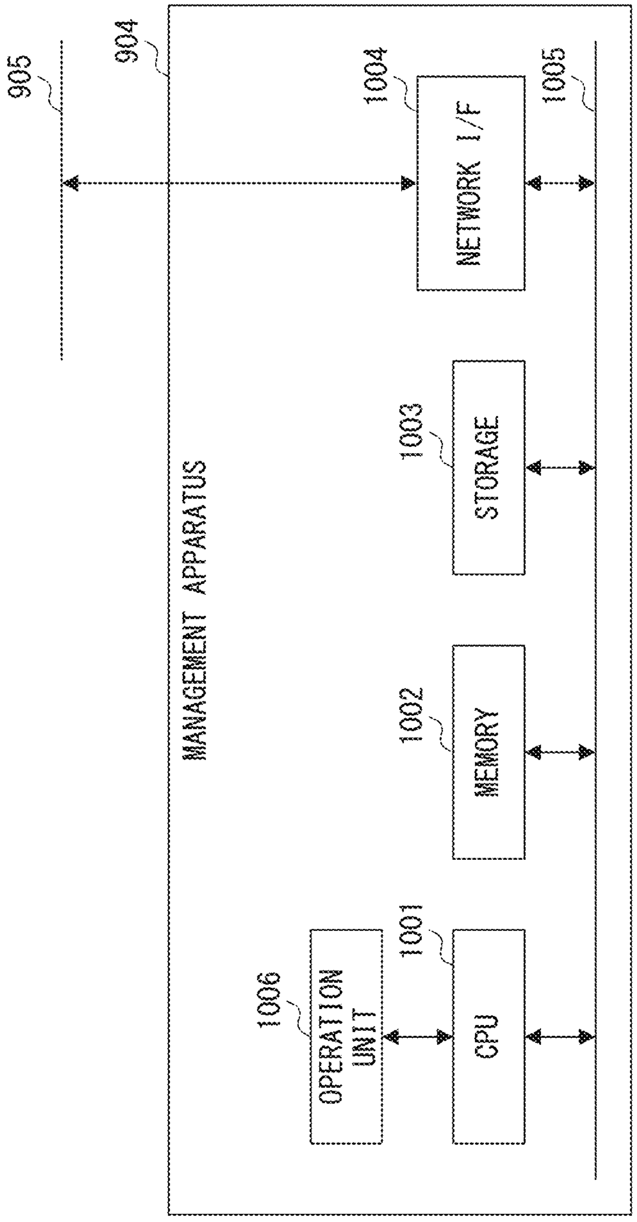
FIG. 10 is a configuration diagram of a management apparatus.

FIG. 10 is a configuration diagram of the management apparatus 904. The management apparatus 904 includes a CPU 1001, a memory 1002, a storage 1003, a network interface (I/F) 1004, and an operation unit 1006. The CPU 1001, the memory 1002, the storage 1003, and the network I/F 1004 are connected to each other via a system bus 1005 so as to be capable of communicating to and from each other.

The CPU 1001 controls overall operation of the management apparatus 904. The memory 1002 stores a starting program of the CPU 1001 and data required for execution of the starting program. The storage 1003 is a storage device with a larger capacity than that of the memory 1002, and is, for example, a hard disk drive (HDD), a solid state drive (SDD), or the like. The storage 1003 stores a control program or the like to be executed by the CPU 1001.

The CPU 1001 executes the starting program stored in the memory 1002 at a start-up of the management apparatus 904. The starting program is a program for loading the control program stored in the storage 1003 into the memory 1002. The CPU 1001 executes the control program loaded into the memory 1002, and it performs various kinds of control. Further, the CPU 1001 communicates to and from another apparatus such as the server 903 via the Internet 905 by using the network I/F 1004. The operation unit 1006 has a function similar to that of the operation unit 212. The operation unit 1006 notifies an instruction to start error cause deduction to the CPU 1001. Moreover, the operation unit 1006 displays a result of error cause deduction under the control of the CPU 1001.

The CPU 1001 executes the processing of FIG. 6 and FIG. 8 to deduce a cause of an error. When the CPU 1001 acquires an instruction to start error cause deduction from the operation unit 1006, the CPU 1001 acquires the in-machine data and the maintenance work flag 503 of the image forming apparatus 901 or 902 from the server 903. The instruction to start error cause deduction includes information indicating which image forming apparatus is to be processed. This information is, for example, identification information of the image forming apparatus. The CPU 1001 acquires the in-machine data and the maintenance work flag 503 of the image forming apparatus indicated by this information from the server 903.

The CPU 1001 deduces the cause of the error of the image forming apparatus 901 or 902 by analyzing the acquired in-machine data and maintenance work flag 503. When it is found out as a result of the deduction that an action is required to be taken, the CPU 1001 displays contents of the action to be taken on the operation unit 1006. In this manner, the error cause deduction system 900 can deduce a cause of an error of each of the image forming apparatuses 901 and 902 which are management targets, and it can notify execution or maintenance work to the CE.

Determination on whether in-machine data is data acquired during maintenance work may be executed by the management apparatus 904. For example, the CE carries around a tablet terminal (not shown) or another apparatus that is not the image forming apparatus 100, and this apparatus transmits information about maintenance work, such as a start time and an end time of the maintenance work, a total printed sheet count at the start of the maintenance work, a total printed sheet count at the end of the maintenance work, and contents of the maintenance work, to the server 903. The management apparatus 904 acquires the information about maintenance work along with in-machine data from the server 903, and it determines whether the in-machine data is data acquired during execution of the maintenance work by cross-checking times of the pieces of information or the total numbers of printed sheets. The management apparatus 904 associates a value of the maintenance work flag 503 that reflects a result of the determination with the in-machine data, and it uses the maintenance work flag 503 in error cause deduction processing.

As described above, in this embodiment, error cause deduction is executed while excluding in-machine data that has been collected during maintenance work. Irregular data is accordingly excluded from data required for error cause deduction. A cause of an error can thus be deduced accurately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201769, filed Dec. 13, 2021, which is hereby incorporated by reference herein in its entirety.

What is claimed is:

1. An information processing apparatus which communicates with an image forming apparatus that forms an image on a sheet, the information processing apparatus comprising:
- an acquisition unit configured to acquire error information about an error that has occurred in the image forming apparatus, and maintenance information about maintenance work performed on the image forming apparatus;
- a memory configured to store a plurality of pieces of error information acquired by the acquisition unit; and
- a controller configured to:
  - determine, from the plurality of pieces of error information stored in the memory, based on the maintenance information, first error information about an error that has occurred during the maintenance work;
  - determine an error part of the image forming apparatus based on second error information obtained by excluding the first error information from the plurality of pieces of error information stored in the memory; and
  - output a result of the determination of the error part.

2. The information processing apparatus according to claim 1, wherein the error information includes information on a date at which the error has occurred.

3. The information processing apparatus according to claim 1, wherein the error information includes information on the cumulative number of pages printed by the image forming apparatus at a time of occurrence of the error.

4. The information processing apparatus according to claim 1, wherein the maintenance information includes information on a date at which the maintenance work has been performed.

5. The information processing apparatus according to claim 1, further comprising a display configured to display the result of the determination of the error part.

6. An information processing apparatus which communicates with an image forming apparatus that forms an image on a sheet with use of a developer in a container, the information processing apparatus comprising:
- an acquisition unit configured to acquire detection information about a detection result of a sensor for detecting the developer in the container, and maintenance information about maintenance work performed on the image forming apparatus;
- a memory configured to store a plurality of pieces of detection information acquired by the acquisition unit; and
- a controller configured to:
  - determine, from the plurality of pieces of detection information stored in the memory, based on the maintenance information, first detection information about a detection result of the sensor that is detected during the maintenance work;
  - determine whether a failure has occurred in the container based on second detection information obtained by excluding the first detection information from the plurality of pieces of detection information stored in the memory of the image processing apparatus; and
  - output a result of the determination of the failure.

7. The information processing apparatus according to claim 6, wherein the detection information includes information on a date at which the detection result of the sensor has been acquired.

8. The information processing apparatus according to claim 6, wherein the detection information includes information on the cumulative number of pages printed by the image forming apparatus which is associated with the detection result of the sensor.

9. The information processing apparatus according to claim 6, wherein the maintenance information includes information on a date at which the maintenance work has been performed.

10. The information processing apparatus according to claim 6, further comprising a display configured to display the result of the determination of the failure.

11. An image forming apparatus that forms an image on a sheet, comprising:
- an acquisition unit configured to acquire maintenance information about maintenance work performed on the image forming apparatus;
- a memory configured to store error information about an error that has occurred in the image forming apparatus, and the maintenance information acquired by the acquisition unit; and
- a controller configured to:
  - determine, from a plurality of pieces of error information stored in the memory, based on the maintenance information, first error information about an error that has occurred during the maintenance work;
  - determine an error part of the image forming apparatus based on second error information obtained by excluding the first error information from the plurality of pieces of error information stored in the memory; and
  - output a result of the determination of the error part.

12. The image forming apparatus according to claim 11, wherein the error information includes information on a date at which the error has occurred.

13. The image forming apparatus according to claim 11, wherein the error information includes information on the cumulative number of pages printed by the image forming apparatus at a time of occurrence of the error.

14. The image forming apparatus according to claim 11, wherein the maintenance information includes information on a date at which the maintenance work has been performed.

15. The image forming apparatus according to claim 11, further comprising a display configured to display the result of the determination of the error part.

16. An image forming apparatus that forms an image on a sheet, comprising:

a developing unit which includes a container containing a developer, and which is configured to form an image with use of the developer in the container;

a sensor configured to detect the developer in the container;

an acquisition unit configured to acquire maintenance information about maintenance work performed on the image forming apparatus;

a memory configured to store detection information about a detection result of the sensor; and a controller configured to:

determine, from a plurality of pieces of detection information stored in the memory, based on the maintenance information acquired by the acquisition unit, first detection information about a detection result of the sensor that is detected during the maintenance work;

determine whether a failure has occurred in the developing unit based on second detection information obtained by excluding the first detection information from the plurality of pieces of detection information stored in the memory of the image forming apparatus; and output a result of the determination of the failure.

17. The image forming apparatus according to claim 16, wherein the detection information includes information on a date at which the detection result of the sensor has been acquired.

18. The image forming apparatus according to claim 16, wherein the detection information includes information on the cumulative number of pages printed by the image forming apparatus which is associated with the detection result of the sensor.

19. The image forming apparatus according to claim 16, wherein the maintenance information includes information on a date at which the maintenance work has been performed.

20. The image forming apparatus according to claim 16, further comprising a display configured to display the result of the determination of the failure.

* * * * *